US005273814A

United States Patent [19]

Kelly

[11] Patent Number: 5,273,814

[45] Date of Patent: Dec. 28, 1993

[54] PROTECTIVE MATERIALS

[75] Inventor: Terri L. Kelly, Wilmington, Del.

[73] Assignee: W. L. Gore & Associates, Inc., Newark, Del.

[21] Appl. No.: 701,373

[22] Filed: May 13, 1991

Related U.S. Application Data

[63] Continuation of Ser. No. 546,273, Jun. 29, 1990, abandoned.

[51] Int. Cl.[5] ........ B32B 5/16; B32B 9/00; B32B 7/00

[52] U.S. Cl. ........ 428/244; 428/247; 428/255; 428/283; 428/408

[58] Field of Search ........ 428/240, 244, 247, 255, 428/283, 323, 408

[56] References Cited

U.S. PATENT DOCUMENTS

| | | | |
|---|---|---|---|
| 3,586,596 | 6/1971 | Ainsworth et al. | 428/244 |
| 3,783,085 | 1/1974 | Pearson et al. | 428/240 |
| 3,787,227 | 1/1974 | Oomen et al. | 428/240 |
| 3,960,651 | 6/1976 | Kometani et al. | 428/256 |
| 4,296,166 | 10/1981 | Ogino | 428/255 |
| 4,454,191 | 6/1984 | Von Blucher et al. | 428/244 |
| 4,455,187 | 6/1984 | von Blücher et al. | 428/244 |
| 4,612,237 | 9/1986 | Frankenburg | 428/255 |
| 4,677,019 | 6/1987 | Von Blucher | 428/244 |
| 4,726,978 | 2/1988 | Simpson | 428/253 |
| 4,816,330 | 3/1989 | Freund et al. | 428/286 |
| 4,869,947 | 9/1989 | Kirayoglu | 428/246 |
| 4,872,220 | 10/1989 | Haruvy et al. | 428/286 |
| 4,877,683 | 10/1989 | Bragaw, Jr. et al. | 428/421 |
| 4,943,475 | 7/1990 | Baker et al. | 428/253 |
| 5,024,594 | 6/1991 | Athayde et al. | 428/246 |

FOREIGN PATENT DOCUMENTS

| | | |
|---|---|---|
| 1038968 | 6/1963 | United Kingdom . |
| 2137608 | 3/1984 | United Kingdom . |

*Primary Examiner*—George F. Lesmes
*Assistant Examiner*—Terrel Morris
*Attorney, Agent, or Firm*—E. Alan Uebler

[57] ABSTRACT

A material for use in fabric which has a liquid barrier layer and a noxious gas barrier layer in which the noxious gas barrier layer comprises solid particulate and a netting that protects the solid particulate.

9 Claims, 3 Drawing Sheets

PROTECTIVE MATERIALS

This application is a continuation of application Ser. No. 07/546,273, filed Jun. 29, 1990 now abandoned.

FIELD OF THE INVENTION

This invention relates to material for use as or in protective fabric, and especially to fabric that protects against toxic chemicals.

BACKGROUND OF THE INVENTION

Protective materials that protect against toxic chemicals have commonly been comprised of layered fabrics. Selected layers of the material are designed to adsorb, absorb, detoxify or react with noxious or toxic vapors, and thereby serve as a "vapor barrier". These layers are typically air permeable. Other layers are designed to prevent passage of harmful liquids, and typically are positioned over the vapor barrier to prevent direct contact of liquid with the adsorbent material. Some such "liquid barriers" are air permeable fabrics which have been treated with repellent finishes. Such systems lack in that they will allow aerosols and particulates to pass through, and with minimum pressure, liquids will pass.

Other air impermeable "liquid barriers" provide adequate liquid protection but are water vapor-impermeable or have limited water vapor-permeability. This they do not "breathe", i.e. allow passage of water vapor and thus, are uncomfortable to the wearer.

A two-layer system containing a water vapor-permeable liquid barrier is described in PCT Application 82/00060 (Publication No. WO 83/02066).

Given that multiple clothing layers are used to provide the liquid and vapor protection, this inherently induces heat stress based on the air layers created. It would be desirable to prepare a protective material for clothing that permits passage of water vapor, such as that built up from perspiration, yet effectively does not allow penetration of noxious gases or liquids, all in one composite. It would further be desirable that the system be launderable.

A water vapor conducting fabric laminates that contains fillers which adsorb toxic chemicals is described in U.S. Pat. No. 4,454,191. However, laminates such as those are limited in the amount of filler that can be incorporated or in that the filler becomes contaminated from the material in which it is contained; both limiting the chemical protection provided.

Systems incorporating lamination of liquid and vapor barriers are described in European Patent 0260841. These systems are limited when the adsorbent system is non-launderable such as is typically the case of non-woven, and foam based systems, which in turn, render the composite non-launderable.

Systems which utilize attachment of carbon spheres onto the liquid barrier surface as described in U.S. Pat. No. 4,554,198 offer good chemical protection but suffer in that the spheres are easily dislodged from the surface. Furthermore, unless special precaution is taken, the solid spheres tend to penetrate the liquid barrier layer disrupting the layer and destroying the barrier properties it was meant to provide.

SUMMARY OF THE INVENTION

This invention provides a material for use as or in fabric that is both a barrier to liquid toxic chemicals and to noxious gases. The material comprises a liquid impenetrable first layer (liquid barrier) and a second layer that prevents passage of noxious gases (noxious gas barrier). The second layer contains solid particulate that absorbs, adsorbs, detoxifies, or chemically reacts with toxic or noxious gases. The invention provides for the provision of a restraining member to prevent penetration by the solid particulate into the liquid impenetrable layer. In one embodiment, the restraining member will be a netting or a mesh positioned adjacent the liquid barrier layer such that the particulate in the noxious gas barrier layer is prevented from being forced into the liquid barrier layer on application of pressure. Forcing the particulate into the liquid barrier would destroy the effectiveness of the liquid barrier.

In a specific embodiment, the material of this invention comprises a liquid water-resistant, preferably water vapor permeable, layer having a water vapor-permeable adhesive on one side, and having at least partially embedded in said adhesive both a netting material and particles of particulate solid, said netting material constructed and arranged to protect the particulate solid from damage upon the application of force perpendicular to the plane of the material.

By "netting" or "net" is meant a meshed arrangement of cords, fibers, filaments, threads or wire.

By "solid particulate" hereinafter is meant a solid particulate that absorbs, adsorbs, detoxifies or chemically reacts with noxious gases.

DESCRIPTION OF THE INVENTION

In the invention described herein, there is provided a novel material that protects against penetration by toxic or noxious chemicals.

It is a feature of this invention that the solid particulate in the noxious gas barrier is substantially prevented from being forced into abusive contact with the liquid barrier layer due to inadvertent or intentional application of pressure.

Figure 1:
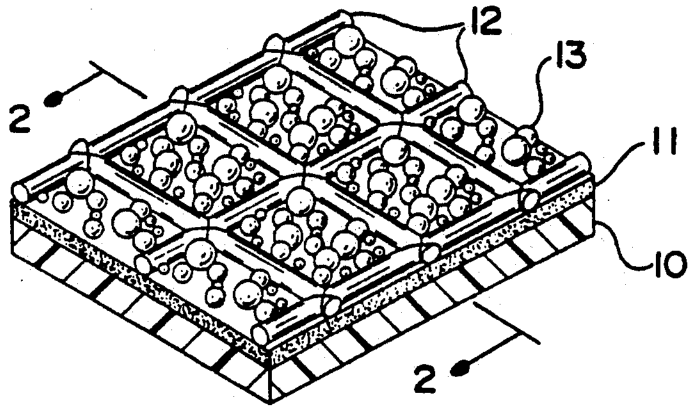
FIG. 1 is a schematic view of a liquid barrier layer 10 which is composed of liquid barrier plastic material and has an adhesive 11 coated on it. The adhesive 11 has mesh strands 12 partially embedded in it and has solid particulate 13 located between the mesh strands 12. Together, adhesive 11 and particulate 13 comprise the noxious gas barrier.
Figure 2:
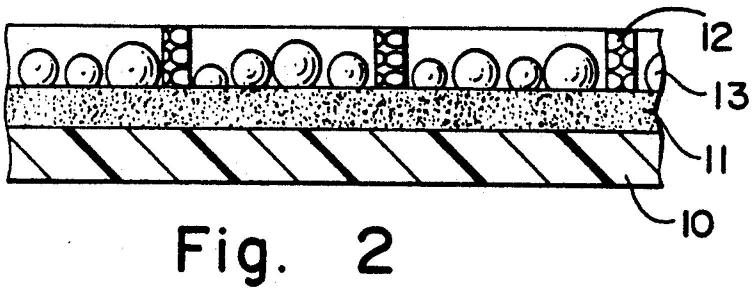
FIG. 2 is a cutaway view taken along line 2-2 of FIG. 1.

Referring to FIG. 1, liquid resistant, preferably water vapor-permeable, layer 10 preferably comprises a film or membrane or coating of a porous or monolithic polymeric material, for example, porous polyethylene or porous polytetrafluoroethylene (PTFE), or a copolyether ester (such as described in U.S. Pat. No. 4,493,870) or a polyurethane. Porosity can be achieved in known manner, such as salt-leaching, or in the case of PTFE, by stretching as described in U.S. Pat. No. 3,953,566. This layer 10 serves to prevent passage of liquid noxious materials. When the film or membrane is hydrophobic, such as porous PTFE, it provides wet strength and durability to the material in laundering. The chemical inertness of PTFE also provide a support structure which is not susceptable to chemical attack. A second monolithic layer can be employed as an outermost layer to provide additional barrier protection and to aid in providing ease of decontamination.

A water vapor-permeable adhesive layer 11 is ordinarily used to provide means to adhere netting 12 and the solid particulate 13. On the other hand, this layer can also serve as the liquid barrier, as described in Example 9. Preferably, the adhesive is 100 percent solids, phase-separating, segmented, polyurethane prepolymer having hard and soft regions and being the reaction product of:

(i) a polyol having a number average molecular weight of from about 600 to about 3500 and having a functionality of at least 2, and having oxyethylene units;

(ii) an isocyanate having a functionality of at least 2; and (iii) a low molecular weight chain extender having a molecular weight in a range lower than about 400, and having a functionality of at least 2, characterized in that the above reactants are employed in such proportions as to satisfy the following equations:

$$\frac{Eq_{NCO}}{Eq_{OH} + Eq_{CE}} \geqq 0.99$$

$$Eq_{OH} \geqq Eq_{CE}$$

$$Eq_{CE} > 0$$

wherein $Eq_{NCO}$ is the equivalents of the isocyanate species employed, and $Eq_{OH}$ and $Eq_{CE}$ denote the equivalents, respectively, of the polyol and chain extender. The soft segments being provided by the polyol of primarily oxyethylene units, and the suitable hard segments being provided by the reaction product of the isocyanate and chain extender and which induce phase-separation of the hard and soft segments.

More preferred is the reaction product of:

(i) a poly(oxyalkylene) glycol having a number average molecular weight of from about 400 to about 3500;

(ii) a diisocyanate; and (iii) a low molecular weight bifunctional chain extender (C) having a molecular weight in a range lower than about 500.

The hard segment should be a "suitable" hard segment, i.e. one that induces phase-separation of the hard and soft segments found in the prepolymer chain that results in domains of hard segments dispersed in the domains soft segments.

The adhesive 11 provides a means for holding gas adsorbing, gas absorbing or gas reactive solid particulate 13 in place. The particulate most commonly will comprise beads of activated carbon, but can be polymeric material having acidic or basic funtionality which chemically reacts with certain gases. The particulate can be spherical or cubical, or irregularly shaped.

The water vapor permeable adhesive provides a means to adhere the particulate and netting, and also provides a buffer between the particulate and the film or membrane to aid in preventing damage caused by local pressure.

Partially embedded in the adhesive 11 is a mesh or a netting 12 positioned so that its elements extend above the plane of the particles 13, and thus provide protection by sheltering the particulate. The mesh or netting 12 can be made of any natural or synthetic polymer, such as cotton or wool; or a polyester, polyamide, polyolefin, aramid, or polyacrylate, or blends thereof. The chemical make-up of the netting is not critical. The netting 12 provides a protective structure which prevents dislodgement of the particulate 13 caused by abrasion and also provides a means to control displacement of the particulate into the adhesive 11. This in turn limits the potential for the particulate 13 to become completely embedded in adhesive 11 and lose its effectiveness, and also prevents damage caused by localized pressure on the particulate 13.

The cords or threads of the mesh or netting are usually between about .25 mm and 1 mm. thick, and can form hexagonal, square, round, or any other open configuration cells.

Figure 3:
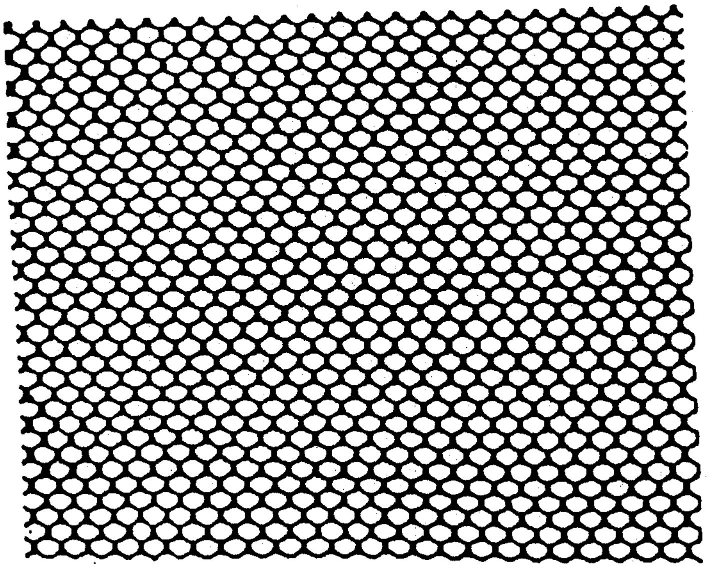
FIG. 3 depicts a sample of netting used in Examples 1-7. There are about 82 cells/per inch$^2$ of hexagonal shape. The netting is made of polyester, has a weight of 1.7 oz/yard$^2$.

In the netting illustrated in FIG. 3, and used in the examples, the netting is made of polyester. It had a weight of 1.7 oz/yd$^2$, a thickness of 0.02 inches (or 0.51 mm). It has about 82 cells per square inch.

An outer shell fabric layer can be adjacent layer 10 employed adjacent layer 10 to provide mechanical protection for the subsequent layers of the laminate, but the shell is not required when the material is to be a liner. The outer shell fabric can be a woven or a knit or felt or a nonwoven fabric. Its make up is not critical and it may be cotton, or wool, or a synthetic such as a polyester, polyamide, aramid, polyacrylate, polyolefin, polyvinyl chloride or the like or a blend of natural and synthetic materials.

The laminate can be made flame-resistant by adding usual flame-retardant materials. The laminate can be made to dissipate static change by addition with usual anti-static agents.

In one specific embodiment, the invention provides a protective fabric comprising, in sequence, layers of:

a) an outer shell fabric;

b) a liquid water-resistant, water vapor-permeable membrane;

c) a water vapor-permeable adhesive adhered to the membrane, said adhesive having a netting on its surface on the side oppposite the membrane;

d) gas absorbing, adsorbing or reactive beads at least partially embedded in said adhesive c).

The fabric can be used in applications where it is desirable to protect against noxious liquids and gases. Thus, it can be used in garments for fire fighting personnel or other industrial or medical applications, or in shelters such as tenting or food protective coverings.

EXAMPLES

EXAMPLE 1

Figure 4:
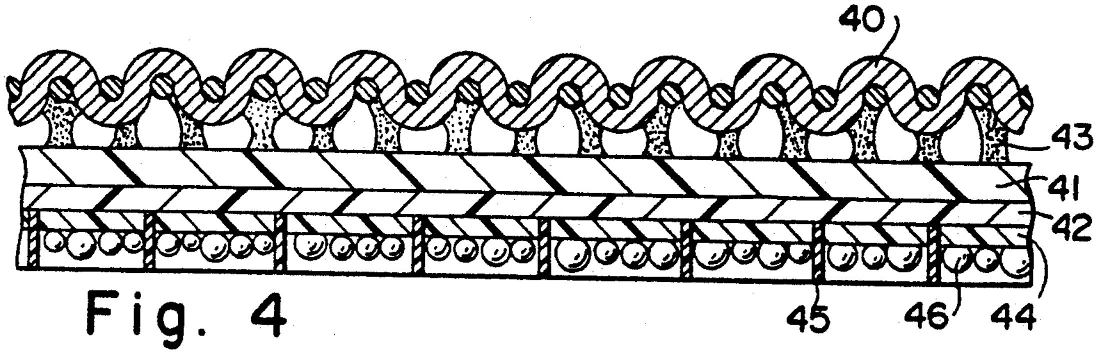
FIG. 4 is a cutaway side view of the fabric of Examples 1 and 2.

Referring to FIG. 4, a laminate was first formed by adhering a 4.5 oz/yd$^2$ woven Nomex Kevlar (95/5) shell fabric 40 to a liquid water-resistant, water vapor-permeable membrane 41 such as a membrane of expanded porous PTFE obtained from W. L. Gore & Associates, Inc. which has a continuous coating 42 of a hydrophilic, water vapor-permeable layer (as described in U.S. Pat. No. 4,194,041) with the coating oriented away from the shell fabric.

Shell fabric 40 was bonded to membrane 41 with adhesive 43 applied in a discrete pattern. Adhesive 43 is a polyether polyurethane as described in U.S. Pat. No. 4,532,316.

A layer 44 of a continuous water vapor-permeable adhesive was then applied to the coating 42. A netting 45 made of polyester yarn was adhered to the layer of water vapor-permeable adhesive 44. The yarn is 0.02 inches thick (0.51 mm), weighs 1.7 oz/yd$^2$ and had an octagonal mesh configuration with 3/32" to 5/32" openings. Spherical beads 46, of Rohm & Haas ambersorb resin XEN-572, were spread over the surface of the netting such that the spherical beads lodged into the open cells of the netting 45 and adhered to the surface of the breathable adhesive 44. The diameter of the spheres was between 0.1 and 0.7 mm. The particle size distribution of the spheres using standard sieves was:

#25 (710 micron)—2.8%
#40 (425 micron)—36.4%
#50 (300 micron)—59.2%
Fines—1.6%

The excess beads not lodged into the open cells of the netting were removed from the surface.

EXAMPLE 2

This Example was carried out as Example 1, but a 2.8 oz/yd$^2$ nylon Taslite woven fabric was substituted for the 4.5 oz/yd$^2$ Nomex Kevlar fabric 40.

EXAMPLE 3

Figure 5:
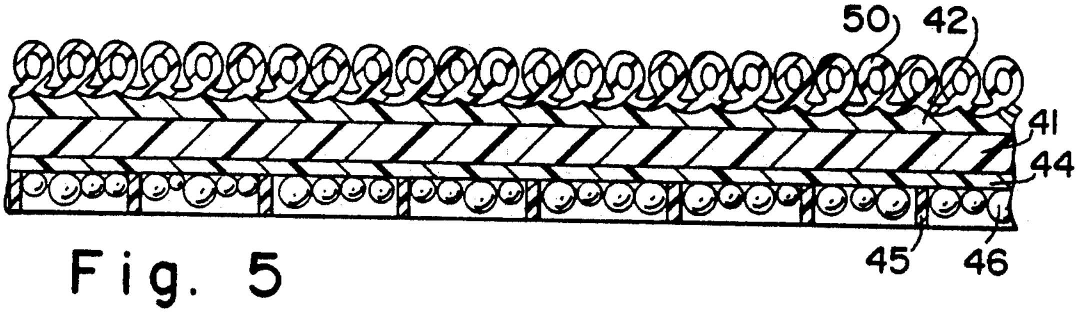
FIGS. 5 through 9 depict cutaway side views of the fabric of Examples 3 through 7, respectively.

Referring to FIG. 5, a laminate was first formed by heat bonding a 1.5 oz/yd$^2$ nylon tricot knit 50 to the membrane 41 used in Example 1 which has the continuous coating 42 of the hydrophilic, water vapor-permeable layer oriented towards the tricot knit layer 50.

The continuous water vapor-permeable adhesive layer 44 of Example 1 was then applied to the laminate on the membrane side. The same procedure was then followed as in Example 1 to add netting 45 and spherical beads 46.

EXAMPLE 4

Figure 6:
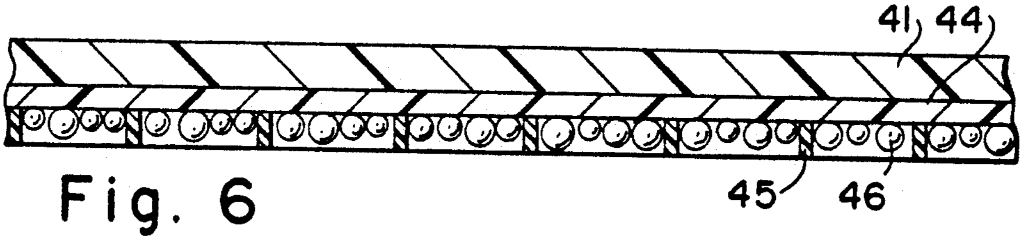

Referring to FIG. 6, the continuous water vapor-permeable adhesive 44 used in Example 1 was applied to the membrane 41 defined in Example 1. A netting fabric 45, the same as described as in Example 1, was adhered to the breathable adhesive 44. Spherical beads 46, defined as in Example 1, were spread over the surface of the netting such that the beads lodged into the open cells of the netting and adhered to the surface of the adhesive 44. The excess beads not lodged into the open cells of the netting were removed from the surface.

EXAMPLE 5

Figure 7:
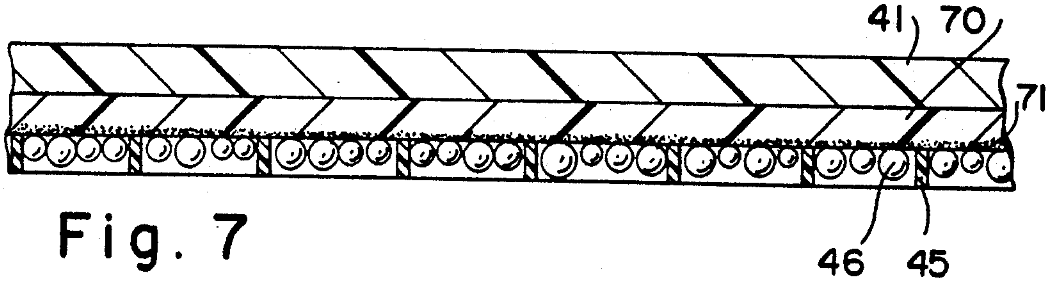

Referring to FIG. 7, a thin porous liquid water-resistant, water vapor-permeable polytetrafluoroethylene membrane 70 was impregnated and coated with a water vapor-permeable adhesive (shown by the dots 71 in 70). This membrane was then laminated to a membrane 41 that was the same as that described in Example 1. A netting fabric 45, the same as that described in Example 1, was adhered to the water vapor-permeable adhesive on the surface of the impregnated membrane 70. The spherical beads 46 used in Example 1 were then spread over the netting surface using the same procedure as in Example 1.

EXAMPLE 6

Figure 8:
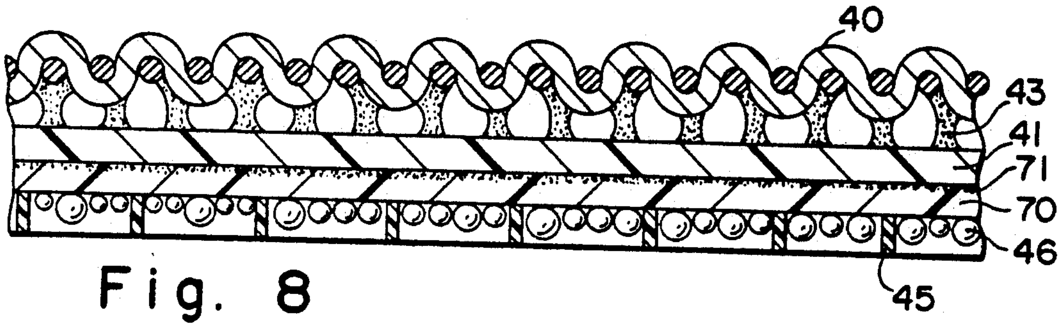

Referring to FIG. 8, a laminate was first formed by adhering a 1.8 oz/yd$^2$ woven nylon taffeta fabric 40 to membrane 41, as described in Example 1. The adhesive 43 used to laminate the two layers was the same as used in Example 1 and was applied in a discrete pattern.

A continuous water vapor-permeable adhesive 71 was used to impregnate and fill the pores of a thin porous PTFE membrane 70 all as described in Example 5. the resulting material was then adhered to the laminate on the membrane side. A netting fabric 45, as used and described in Example 1, was then adhered to the fully impregnated membrane, and spherical beads 46 were then spread over the netting surface using the same procedure as in Example 1.

EXAMPLE 7

Figure 9:
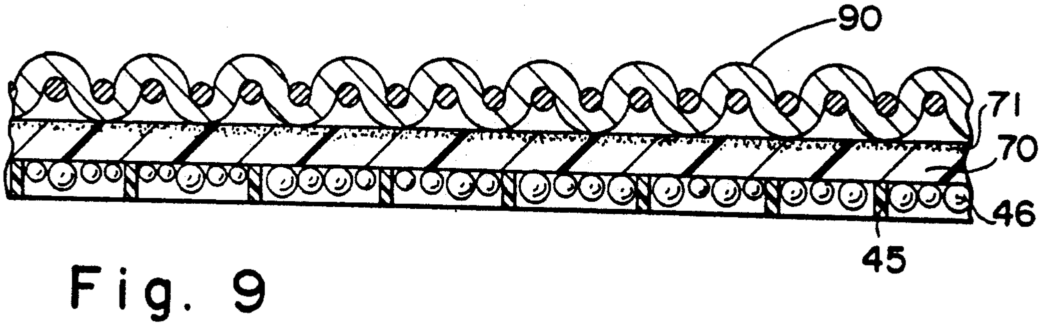

Referring to FIG. 9, the continuous water vapor-permeable adhesive 71 was used to fully impregnate the pores of a thin porous PTFE membrane 70 as described in Example 6. The membrane was then laminated to a 2.8 oz/yd$^2$ nylon Taslite woven fabric 90. A netting fabric 45, the same as described in Example 1, was adhered to the fully impregnated membrane 70. Spherical beads 46, the same as described in Example 1, were then spread over the netting surface using the same procedure as in Example 1.

I claim:

1. A material for use in fabrics which comprises a laminate that protects against toxic chemicals comprising:

a) a liquid impenetrable layer, b) a second layer adjacent the liquid impenetrable layer comprising a water vapor-permeable polymeric adhesive, said second layer having on its outer surface solid particulate at least partially embedded therein that absorbs, detoxifies, or chemically reacts with noxious gases, said second layer also having a netting across its outer surface positioned and constructed to protect the solid particulate from abrasion and dislodgement.

2. The material of claim 1 wherein the liquid impenetrable layer is a liquid water-resistant, water vapor-permeable membrane.

3. The material of claim 2 wherein the liquid water-resistant, water vapor-permeable membrane is a porous polymeric material.

4. The material of claim 3 where the porous polymeric material is polytetrafluoroethylene.

5. The material of claim 1 wherein the water vapor-permeable polymeric adhesive is a polyurethane.

6. The material of claim 1, 2, 3, 4, or 5 wherein the solid particulate is carbon.

7. A fabric containing a laminate that protects against toxic chemicals, said laminate comprising:

a) a liquid impenetrable layer.

b) a second layer adjacent the liquid impenetrable layer comprising a water vapor-permeable polymeric adhesive, said second layer having on its outer surface solid particulate at least partially embedded therein that adsorbs, detoxifies, or chemically reacts with noxious gases, and said second layer having a netting across its outer surface positioned and constructed to protect the solid particulate from abrasion and dislodgement.

8. The fabric of claim 7 wherein the liquid impenetrable barrier of the laminate is a liquid water resistant, water vapor-permeable membrane.

9. The fabric of claim 8 wherein the membrane is porous polytetrafluoroethylene.

* * * * *